(12) United States Patent
Bureloux et al.

(10) Patent No.: US 9,138,966 B2
(45) Date of Patent: Sep. 22, 2015

(54) METHOD FOR MANUFACTURING A SILKSCREEN PRINTED LAMINATED GLASS PANEL USING A DOUBLE-WEAVE SILKSCREEN

(75) Inventors: Dominique Bureloux, Ognes (FR); Thierry Dumenil, Margny les Compiegne (FR); Sebastien Wery, Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 135 days.

(21) Appl. No.: 13/977,410

(22) PCT Filed: Dec. 29, 2011

(86) PCT No.: PCT/FR2011/053209
§ 371 (c)(1),
(2), (4) Date: Dec. 6, 2013

(87) PCT Pub. No.: WO2012/089988
PCT Pub. Date: Jul. 5, 2012

(65) Prior Publication Data
US 2014/0087154 A1    Mar. 27, 2014

(30) Foreign Application Priority Data

Dec. 29, 2010    (FR) ..................................... 10 61350

(51) Int. Cl.
*B32B 17/10*    (2006.01)
*B41N 1/24*    (2006.01)
*B41M 1/12*    (2006.01)
*B41M 1/34*    (2006.01)
*B32B 37/12*    (2006.01)

(52) U.S. Cl.
CPC ....... *B32B 17/1055* (2013.01); *B32B 17/10036* (2013.01); *B32B 17/10165* (2013.01); *B32B 17/10275* (2013.01); *B32B 17/10761* (2013.01); *B32B 17/10908* (2013.01); *B32B 37/1284* (2013.01); *B41M 1/12* (2013.01); *B41M 1/34* (2013.01); *B41N 1/24* (2013.01); *B41N 1/247* (2013.01); *Y10T 428/24868* (2015.01)

(58) Field of Classification Search
CPC ............ B41M 1/12; B41M 1/34; B41N 1/24; B32B 17/10165; B32B 17/10275; B32B 17/10761; Y10T 428/24802
See application file for complete search history.

(56) References Cited

U.S. PATENT DOCUMENTS

2011/0052886 A1    3/2011    De Salins et al.
2014/0087154 A1*   3/2014    Bureloux et al. ............. 428/203

FOREIGN PATENT DOCUMENTS

JP    52-051207    *    4/1977    ............... B41N 1/24
WO    WO 2009/122075 A2    10/2009

OTHER PUBLICATIONS

International Search Report issued Mar. 21, 2012 in PCT/FR2011/053209 submitting English translation only.

* cited by examiner

*Primary Examiner* — Betelhem Shewareged
(74) *Attorney, Agent, or Firm* — Oblon, McClelland, Maier & Neustadt, L.L.P.

(57) ABSTRACT

The invention relates to a process for manufacturing a printed laminated glazing unit composed of two glass sheets separated by an interlayer adhesive sheet, comprising the steps consisting in screen printing, with a printing composition, at least one face of one of the sheets making up the glazing unit using a screen printing screen; and in assembling the various sheets making up the glazing unit, at least one of which has been screen printed. In this process a screen printing screen is used that comprises two superimposed fabrics, the fabric (I) intended to be placed opposite the face to be screen printed having a smaller mesh opening than the other fabric (S), the difference in mesh opening between the two fabrics lying in the range from 22 to 65 µm.

16 Claims, No Drawings

METHOD FOR MANUFACTURING A SILKSCREEN PRINTED LAMINATED GLASS PANEL USING A DOUBLE-WEAVE SILKSCREEN

CROSS REFERENCE TO RELATED APPLICATIONS

The present application is a 35 U.S.C. §371 national stage patent application of International patent application PCT/FR2011/053209, filed on Dec. 29, 2011, published as WO 2012/089988 on Jun. 5, 2012, the text of which is incorporated by reference, and claims the benefit of the filing date of French application no. 1061350, filed on Dec. 29, 2010, the text of which is also incorporated by reference.

The invention relates to the field of laminated glazing units, and more particularly to the screen printing of a laminated glazing unit.

Laminated glazing units are frequently used as vehicle windshields. They have many uses: a layer that reflects solar radiation, making it possible to lower the temperature of the instrument panel and the ambient temperature in the passenger compartment, a support for the interior rearview mirror, electric current feed busbars especially for an ITO layer or a network of heating wires, an upper strip that filters solar radiation of optionally graduated coloration, a rain detector, etc.

Laminated glazing units are printed for various purposes: edge of the glazing unit opacified over its entire periphery in order to protect the underlying adhesive and hide body components or seals from the view of an observer outside of the vehicle, markings relating to the manufacturer, or to various standards, opacified surface in order to hide the base of the interior rear-view mirror from the view of an observer outside of the vehicle.

It is customary to produce such printing on sheets of flat glass, that is to say, where appropriate, before bending operations (this is because it is much more difficult to print onto curved surfaces). One preferred process is screen printing. This process consists in placing, on top of the sheet to be printed, a screen printing screen comprising a part made of ink-permeable fabric, the shape of which defines the printing pattern, and a part rendered impermeable to the ink. The printing composition is deposited on the screen and, by pressing it with a squeegee against the screen, it is caused to settle on the sheet to be printed. Screen printing is able to provide the required optical qualities: good coverage, opacity and resolution, and can be easily industrialized.

However, screen printing on flat glass sheets is not without drawbacks. In particular, the sheets of glass, during the bending thereof, in pairs, come into physical contact with one another or with mechanical components of the bending equipment. This physical contact requires the prior use of an additional furnace for the annealing of the printing composition, in order to prevent the printed surfaces that are insufficiently hardened and dried from being adversely affected.

To solve this problem, publication WO 2009/122075 proposes to print not the glass sheets of the laminated glazing, but the polyvinyl butyral interlayer adhesive sheet. For this purpose, WO 2009/122075 describes a composition that enables the screen printing of a pattern onto a sheet of polyvinyl butyral in a single pass with improved "touch dry" times.

Publication NL9200702 is also known, which describes a screen printing screen formed from two screen meshes of different fineness.

The screen printing processes of the prior art lead to unacceptable printing results when they are carried out on sheets having significant surface roughnesses (for example having a surface roughness, defined as the value of the arithmetic mean deviation of the profile Ra, of several tens of µm).

This is because the roughness traps a larger amount of the printing composition, which increases the size of the pattern. The grooves formed by the roughness guide the printing composition to the surface of the sheet before drying, which leads to a deformation of the pattern. Furthermore, the printing composition is distributed unequally at the surface of the sheet, which results in excessively high gray levels.

The prior art processes do not therefore make it possible to obtain, when the printing is carried out on a sheet having a high surface roughness:
  a good definition of the printed pattern, with sharp contours, without smudging and without deformation;
  an acceptable opacity;
  a small amount of gray levels;
  good coverage, which is expressed by the complete absence of transparency in the form of pinholes.

It has surprisingly been discovered that it is possible to obtain these properties using a screen printing screen that comprises two superimposed fabrics, the fabric (I) intended to be placed opposite the face to be screen printed having a smaller mesh opening than the other fabric (S), the difference in mesh opening between the two fabrics lying in the range from 22 to 65 µm.

The present invention therefore proposes a process for manufacturing a printed laminated glazing unit composed of two glass sheets separated by an interlayer adhesive sheet, comprising the steps consisting in:
  (a) screen printing, with a printing composition, at least one face of one of the sheets making up the glazing unit, using a screen printing screen; and
  (b) assembling the various sheets making up the glazing unit, at least one of which has been screen printed;
characterized in that a screen printing screen is used that comprises two superimposed fabrics, the fabric (I) intended to be placed opposite the face to be screen printed having a smaller mesh opening than the other fabric (S), the difference in mesh opening between the two fabrics lying in the range from 22 to 65 µm.

The superimposition of two layers of fabrics on one and the same screen controls the behavior of the ink during the transfer to the sheet to be screen printed and makes it possible to prevent the deformation of the printed pattern. The process also makes it possible to deposit a larger amount of printing composition on the surface of the sheet to be screen printed and therefore improves the opacity and the optical density of the printed pattern. In addition, the process reduces the gray levels, that is to say allows the printing of a uniformly black or colored pattern.

It has surprisingly been discovered that a difference in mesh opening of greater than 65 µm does not make it possible to obtain acceptable printing characteristics as regards the optical density, the printability and the resolution of the printed pattern. Furthermore, a difference in mesh opening of less than 22 µm does not make it possible to obtain an acceptable resolution and an acceptable printability of the pattern.

The 2 layers of fabric of the screen are superimposed, each being fixed to the screen frame. They may be joined to one another, for example by clamping or adhesive-bonding means over one or more of their edges.

A pattern may be defined on the screen by the process commonly used in screen printing, such as plate making, that is to say coating and curing of an emulsion on the screen. The pattern may be defined on one or the other of the fabrics or on both fabrics.

Advantageously, the difference in mesh opening between the two fabrics lies in the range from 28 to 43 µm.

For example, the fabric (I) may have a mesh opening between 60 and 90 µm.

The fabric (S) may have a mesh opening between 90 and 130 µm.

Advantageously, the yarns of the fabric (I) have a smaller diameter than the yarns of the fabric (S). The difference in diameter is preferably between 5 and 30 µm.

The yarns of the fabric (I) may have a diameter of from 30 µm to 60 µm, in particular from 40 µm to 48 µm.

The yarns of the fabric (S) may have a diameter of from 50 µm to 80 µm, in particular from 55 µm to 70 µm.

The weft of the fabric (I) is preferably substantially non-parallel to the weft of the fabric (S). Advantageously, the weft of the fabric (I) forms an angle of 53 to 83 degrees, in particular of 60 to 75 degrees with the weft of the fabric (S).

The fabric (I) and the fabric (S) may be made of polyamide. It is also possible to use any material customarily used in screen printing.

In one embodiment, at least one of the faces of the interlayer adhesive sheet, which is a sheet of plastic, preferably of polyvinyl butyral, is screen printed.

In the case of printing onto the interlayer adhesive sheet, in particular of polyvinyl butyral, the printing composition may be one of the ink compositions from publication WO 2009/122075, in particular a composition comprising a polyvinyl butyral resin having a molecular weight, evaluated by gel permeation chromatography, centered about a value at most equal to 50,000, preferably at most equal to 40,000, more preferably at most equal to 30,000 in polystyrene equivalents.

Advantageously, the polyvinyl butyral resin has a molecular weight at least equal to 10,000, preferably to 15,000.

It is preferred that the [OH] content of the polyvinyl butyral resin corresponds to a weight percentage of polyvinyl alcohol of 22%, preferably 20% and in particular 18% and a minimum weight percentage of 9%, preferably 11% and in particular 13%.

Preferably, the glass transition temperature $T_6$ of the polyvinyl butyral resin is at most equal to 70° C.

One preferred ink composition is a composition comprising 2% to 35% by weight of polyvinyl butyral resin and 1% to 50% by weight of at least one pigment and/or another particle and/or a dye and/or a luminophore.

The pigments, particles, dyes and luminophores may be chosen from those described in publication WO 2009/122075.

According to other preferred features of the composition, it comprises 30% to 75% by weight of solvent. It may also comprise 0.2% to 3% by weight of a thixotropic agent consisting of a silica or several silicas as a mixture.

The solvent that solubilizes the polyvinyl butyral resin may also be chosen from those described in publication WO 2009/122075.

The at least one face of the interlayer adhesive sheet that is screen printed may have a surface roughness, defined as the value of the arithmetic mean deviation of the profile Ra, of more than 20 µm, in particular of more than 30 µm.

The process according to the invention is also advantageous for screen printing onto sheets that are less rough or that are not rough. It then enables the optical density of the printed laminated glazing unit to be improved.

In one embodiment, at least one of the faces of one of the glass sheets is screen printed, and the printing composition is an enamel.

The process then makes it possible to increase the thickness of the enamel layer deposited on the glass, and therefore the opacity of the printed pattern, while retaining a resolution similar to that obtained with a single-weave screen printing screen.

The invention also relates to a printed laminated glazing unit obtained by the process as defined above.

Advantageously, the printed laminated glazing unit has an optical density of greater than 3, preferably than 4, over its printed part.

Preferably, the printed laminated glazing unit has gray levels of less than 5 over its printed part.

To better illustrate the subject of the present invention, without however limiting the scope thereof, several examples thereof will be described below.

EXAMPLE 1

Manufacture of a Laminated Glazing Unit According to the Invention

In this example, a pattern was screen printed onto a rough sheet of polyvinyl butyral of Solutia RF41 type before assembling it between two glass sheets in order to manufacture a laminated glazing unit.

The patterns consisted of lines of circles having a diameter of 2.23 mm and 2.26 mm.

The printing was carried out according to the process of the invention, with the aid of a double-weave screen printing screen. The screen S comprised 55 yarns/cm, the yarns having a diameter of 64 µm. The screen I comprised 77 yarns/cm, the yarns having a diameter of 48 µm.

By way of comparison, a printed laminated glazing unit was also prepared with the aid of the process from the prior art, using a single-weave screen.

The laminated glazing units prepared according to the two processes were analysed for their optical density, their gray levels and the definition of the printed pattern.

The optical density was measured with an X-Rite 341 densitometer. The mean value of optical density was computed from 10 measurement points.

The definition of the printed pattern was evaluated by measuring the maximum diameter of the circular patterns printed.

Table 1 below presents the results of the analyses.

TABLE 1

Comparison of the printing characteristics obtained with a single-weave screen and a double-weave screen according to the invention.

|  | Single-weave screen (comp) | Double-weave screen (inv) |
|---|---|---|
| Mean value of optical density | 4.09 | 4.51 |
| Mean values of gray levels | 4.69 | 4.18 |

TABLE 1-continued

Comparison of the printing characteristics obtained with a single-weave screen and a double-weave screen according to the invention.

|  | Single-weave screen (comp) | Double-weave screen (inv) |
|---|---|---|
| Diameter of the printed pattern (pattern having a diameter of 2.26 mm) | 2.395 mm | 2.312 mm |
| Diameter of the printed pattern (pattern having a diameter of 2.23 mm) | 2.382 mm | 2.320 mm |

The process according to the invention therefore provides a clear improvement in terms of optical density. It therefore makes it possible to reinforce the opacity of the glazing unit and its protective function.

Furthermore, it reduces the gray levels and therefore produces a more uniform printed pattern.

It also makes it possible to obtain a smaller deformation of the printed pattern, thus improving the definition of the printing.

EXAMPLE 2

Comparison Between Several Double-Weave Screens

The procedure of example 1 was followed, by testing various double-weave screen configurations, each having a particular value of the difference in mesh openings.

Screen 11 is a double-weave screen according to the invention. The other screens 12 to 15 are double-weave screens that have a difference in mesh openings outside of the range of the invention.

For each screen configuration, 3 properties were evaluated: the printability of the pattern, the optical density of the finished laminated glazing unit and the resolution. Only screen 11, according to the invention, enables satisfactory printing of the pattern according to these three criteria.

The other configurations of screens 12 to 15 are not satisfactory in terms of resolution and printability. Furthermore, screens 14 and 15 give unacceptable results in terms of optical density.

TABLE 2 comparison between several double-weave screens

| Screen | Fabric S | | | Fabric I | | | Difference in mesh opening ($\mu$m) |
|---|---|---|---|---|---|---|---|
|  | No. of yarns/cm | Yarn diameter ($\mu$m) | Mesh opening ($\mu$m) | No. of yarns/cm | Yarn diameter ($\mu$m) | Mesh opening ($\mu$m) |  |
| 11 (inv) | 55 | 64 | 117.8 | 77 | 48 | 81.9 | 35.9 |
| 12 (comp) | 68 | 55 | 92.1 | 90 | 40 | 71.1 | 20.9 |
| 13 (comp) | 51 | 70 | 126.1 | 77 | 48 | 81.9 | 44.2 |
| 14 (comp) | 43 | 80 | 152.6 | 77 | 48 | 81.9 | 70.7 |
| 15 (comp) | 43 | 80 | 152.6 | 90 | 40 | 71.1 | 81.4 |

The invention claimed is:

1. A process for manufacturing a printed laminated glazing unit comprising two glass sheets separated by an interlayer adhesive sheet, the process comprising:
    (a) screen printing, with a printing composition, at least one of the faces of the interlayer adhesive sheet, which is a sheet of plastic, with a screen printing screen; and
    (b) assembling the glass sheets and the interlayer adhesive sheet of the glazing unit, at least one of which has been screen printed;
    wherein the screen printing screen comprises two superimposed fabrics, the fabric (I) intended to be placed opposite the face to be screen printed having a smaller mesh opening than the other fabric (S), wherein the difference in mesh opening between the two fabrics is in the range from 28 to 43 $\mu$m, the fabric (I) having a mesh opening in a range from 60 and 90 $\mu$m and the fabric (S) having a mesh opening in a range 90 and 130 $\mu$m.

2. The process of claim 1, wherein yarns of the fabric (I) have a smaller diameter than yarns of the fabric (S).

3. The process of claim 1, wherein yarns of the fabric (I) have a diameter of from 30 $\mu$m to 60 $\mu$m.

4. The process of claim 1, wherein yarns of the fabric (S) have a diameter of from 50 $\mu$m to 80 $\mu$m.

5. The process of claim 1, wherein the weft of the fabric (I) forms an angle of 53 to 83 degrees with the weft of the fabric (S).

6. The process of claim 1, wherein the fabric (I) and the fabric (S) each comprise a polyamide.

7. The process of claim 1, wherein the printing composition comprises a polyvinyl butyral resin having a molecular weight, measured by gel permeation chromatography, centered about a value at most equal to 50 000 in polystyrene equivalents.

8. The process of claim 1, wherein the at least one face of the interlayer adhesive sheet that is screen printed has a surface roughness, defined as the value of the arithmetic mean deviation of the profile Ra, of more than 20 μm.

9. A printed laminated glazing unit obtained by the process of claim 1.

10. The printed laminated glazing unit of claim 9, having an optical density of greater than 3 over its printed part.

11. The printed laminated glazing unit of claim 9, having gray levels of less than 5 over its printed part.

12. The process of claim 1, wherein the interlayer adhesive sheet comprises polyvinyl butyral.

13. The process of claim 1, wherein yarns of the fabric (I) have a diameter of from 40 μm to 48 μm.

14. The process of claim 1, wherein yarns of the fabric (S) have a diameter of from 55 μm to 70 μm.

15. The process of claim 1, wherein the weft of the fabric (I) forms an angle of 60 to 75 degrees with the weft of the fabric (S).

16. The process of claim 8, wherein the surface roughness, Ra, of the at least one face of the interlayer adhesive sheet is more than 30 μm.

\* \* \* \* \*